No. 624,057. Patented May 2, 1899.
H. W. LOCKE.
REVERSIBLE BACK FOR CAMERAS.
(Application filed Feb. 11, 1899.)
(No Model.)
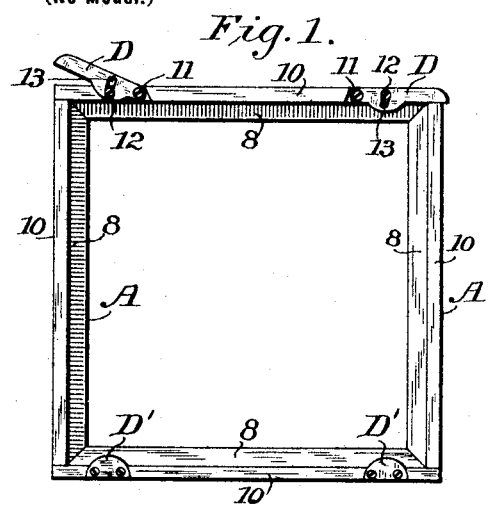
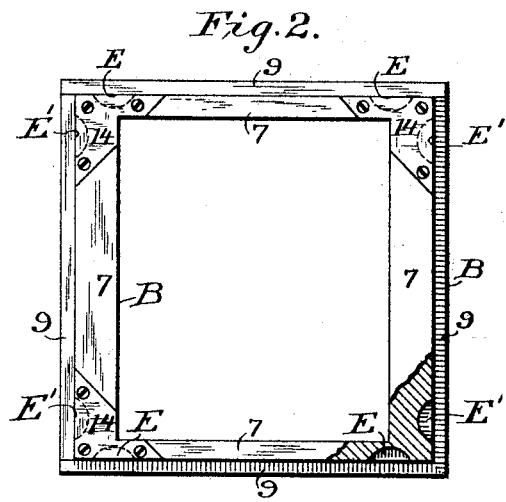
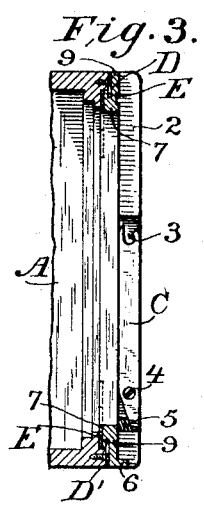
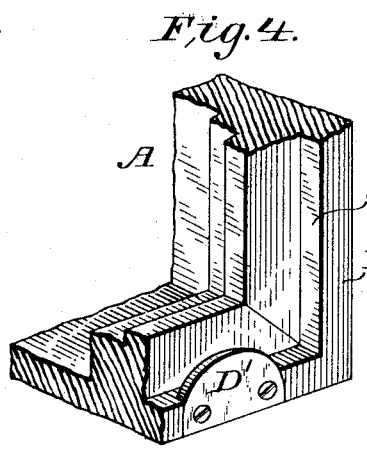
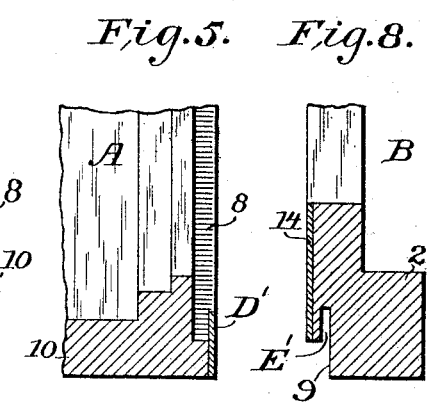
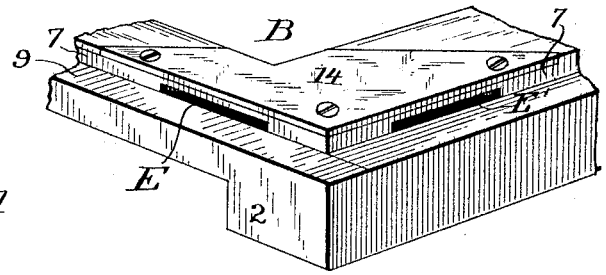
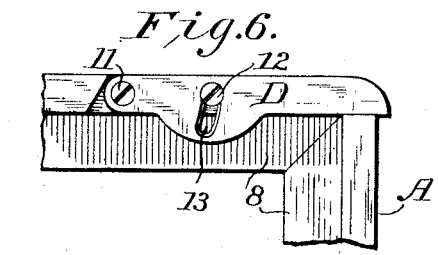
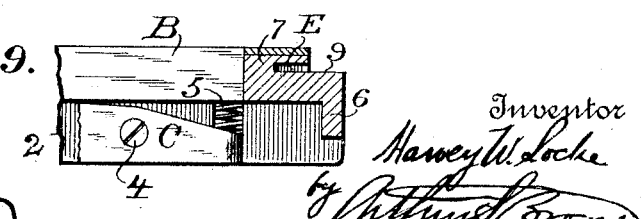
Witnesses
Jas. S. Latimer
Theo. T. Snell
Inventor
Harvey W. Locke
by Arthur P. Browne
his Attorney
THE NORRIS PETERS CO., PHOTO-LITHO., WASHINGTON, D. C.

UNITED STATES PATENT OFFICE.

HARVEY W. LOCKE, OF ROCHESTER, NEW YORK, ASSIGNOR TO WILLIAM F. CARLTON, OF SAME PLACE.

REVERSIBLE BACK FOR CAMERAS.

SPECIFICATION forming part of Letters Patent No. 624,057, dated May 2, 1899.

Application filed February 11, 1899. Serial No. 705,290. (No model.)

*To all whom it may concern:*

Be it known that I, HARVEY W. LOCKE, a citizen of the United States, residing at Rochester, in the county of Monroe and State of New York, have invented certain new and useful Improvements in Reversible Backs for Photographic Cameras, of which the following is a specification.

The class of photographic cameras to which this invention relates is characterized by the employment to support the holder for the sensitive plate or film of what is known as a "reversible back," said back consisting, essentially, of an equal-sided hollow frame which is secured by temporary fasteners to the body of the camera in such manner that the said frame (or back) can be attached or detached at will and can be attached with a given edge, either horizontal or vertical, as may be desired.

It is most usual to take photographs on elongated plates or films, and the reversibility of the back enables both horizontal pictures— that is, pictures whose width exceeds their height—and vertical pictures—that is, pictures whose height exceeds their width—to be taken by the same camera by shifting the back without requiring the position of the body of the camera to be changed. To turn the camera bodily over onto its side would in many cases be objectionable, particularly in the case of a bellows camera mounted on a tripod and fastened thereto, as is customary.

The reversible back is secured to an equal-sided hollow frame forming part of the camera-body. The last-mentioned frame is herein called the "camera-box" to distinguish it from the reversible back. In the form of camera more particularly included in the invention said camera-box forms part of a shallow case in which the front or lens-bearing portion of the camera and the bellows are housed when the instrument is closed; but the said box may, without exceeding the limits of the invention, form part of a case of greater depth, so as to house the camera-front when the instrument is in use and, if desired, so as also to take the place of the bellows, or it may, still within the limits of the invention, be of any desirable depth and be itself housed within an exterior box or case when closed or when in use, or in both cases.

In accordance with the present invention the two equal-sided hollow frames, one carrying the means for supporting the holder for the sensitive plate or film and constituting the camera-back, while the other or camera-box forms part of the body of the camera, are held together by the aid of movable catches of thin flat material, (sheet metal, in fact,) which are so mounted on one of said frames (most advantageously on the camera-box) as to lie in the plane of the camera-back and to move in said plane and which engage in retaining-recesses on one or other of adjacent sides of the other frame, according to the position of the camera-back—that is to say, the recesses on one of said sides are engaged by the said movable catches when the said back is in one position and those on the adjacent side when the said back is reversed. The said movable catches may be one or more in number. There must of course be duplicate recesses for each catch to be engaged thereby in turn, according to the position of the back. This statement is applicable not only to the invention, as above specified, but to the further improvements or combinations hereinafter set forth. One such further improvement consists in forming the reversible back with a rabbeted edge, so as to leave a projecting margin around the equal-sided anterior portion which fits inside of the correspondingly-shaped open end of the camera-box, the duplicate retaining-recesses being formed in the edges of said anterior portion and the movable flat catches lying and moving in the plane of said anterior portion of the back. A third improvement consists in placing the flat movable catches (which lie and move in the plane of the back) in the joint between the rear edge of the camera-box and the overlapping margin of the rabbeted reversible back, so that when the back is in place the outlines of the catches are blended, as it were, with the outlines of the back and the box and the narrow exposed edges of the catches are hardly visible.

The invention also comprises the special constructions, improvements, or combinations hereinafter set forth.

The accompanying drawings, which form part of this specification, illustrate what is considered the best mode of carrying the invention into effect.

In the drawings, Figure 1 is a rear view of the camera-box. Fig. 2 is a front view of the reversible back, partly broken away. Fig. 3 is a view in section through the box and back, showing them united. Fig. 4 is a perspective view, partly in section, of one corner of the camera-box on an enlarged scale. Fig. 5 is a sectional view, on a large scale, of a portion of the camera-box. Fig. 6 is a rear view of a portion of the camera-box, showing one of the movable catches on a large scale. Figs. 7 and 8 are respectively a perspective and a sectional view of a portion of the reversible back; and Fig. 9 is a sectional view of another portion of the reversible back, the section being in the plane of Fig. 3, which plane is at right angles to that of Fig. 8.

The hollow frames constituting, respectively, the camera-box A and the back B are square, (equal-sided.) The back B carries the means for supporting the holder for the sensitive plate or film. These means may be of any known or suitable description; but it is an advantage and an essential element of one of the special constructions, improvements, or combinations hereinabove referred to that the back should be provided with projecting guides on its posterior face for receiving between them the holder of the sensitive plate or film. Such guides are shown at 2. The said holder may be retained between said guides by a spring-actuated device carrying the ground-glass screen and so arranged that the plate or film holder can be slid between the said device and the back of the camera. Holder-supporting means of this description are known and do not require any particular explanation. The receding device, therefore, is not shown; but at C is shown one of the spring-actuated levers to which said device is pivoted. At 3 is the notch for receiving the pivots, at 4 the fulcrum of the lever, and at 5 a spiral compression-spring interposed between the lever and the camera-back, so that it tends to press inward the end of the lever C, which carries said receding device. If the plate or film holder should be slipped endwise into the space between the guides 2, the device carried by the levers C will recede, (or, in other words, be moved away by the holder, which enters between the camera-back and the said device.) When the holder has been fully inserted, it is arrested by the stop 6.

To retain the back B in the camera-box A, use is made of thin flat catches D, which lie in the plane of the said back, when this is in position, and are movable in said plane, and of duplicate retaining-recesses E E' on adjacent sides of the corresponding frame, so that for vertical (tall) pictures the catches D engage the recesses E, while for horizontal (broad) pictures the same catches D engage the recesses E'. In connection with the movable catches it is advantageous and an element of another of the special constructions, improvements, and combinations hereinabove referred to to use also fixed catches, as shown at D', duplicate retaining-recesses being provided for these as for the movable catches.

The square back B is formed with a rabbeted edge, so as to leave a projecting margin 9 around the equal-sided anterior portion 7, which fits the correspondingly-shaped inside 8 of the camera-box A. Said margin 9 covers the edge 10 of the box when the back is in place. The duplicate retaining-recesses E E' are formed in the edges of the said anterior portion 7 and the catches D D' are mounted opposite the same on the camera-box A. Each of the movable catches D is composed of a flat piece of metal hinged at 11 and limited by a screw 12, which passes through a slot 13. The same is placed in joint between the rear edge 10 of the camera-box A and the overlapping margin 9 of the rabbeted reversible back B, so that when the back is in place the outlines of the narrow exposed edge of the catch are hardly noticeable. In Fig. 1 the rear face of each catch D is shown exposed, and this face is next the margin 9 of the back.

Two movable catches D and two fixed catches D' are shown; but no particular number is essential. The conjoint use of fixed and movable catches is useful in diminishing the number of catches requiring manipulation, while giving equal security.

In order to apply the back for vertical (tall) pictures, the front 7 is inserted in the end 8 of the camera-box by first slipping the recesses E at one edge of the back over the fixed catches D' as the back is inserted. At this time the movable catches D are withdrawn, (the left-hand catch D in Fig. 1 is in the withdrawn position,) so as not to interfere with the insertion of the back. The catches D are then engaged in the corresponding recesses E in order to hold the back firmly in place. For horizontal (broad) pictures the catches D are withdrawn, the back is removed and reversed, (turned,) and is reapplied with the catches D D' engaging the recesses E'. The metal plates 14 are to strengthen the back, particularly the retaining-walls of the recesses E E'. These recesses (which form the hasps of the catches D D') might of course be formed by such plates merely by letting the latter into the back, or the said recesses (or hasps) might be made in any suitable way.

I claim as my invention or discovery—

1. In combination with the equal-sided hollow frames, one carrying the means for supporting a plate or film holder so as to constitute the reversible back of a photographic camera and the other frame forming part of the body of the camera, movable catches of sheet metal mounted on one of said frames so as to lie and to move in the plane of the camera-back and engaging different retaining-recesses according to the position of said back, the frame with said recesses having them on adjacent sides, so that whether a given side of the said back is vertical or horizontal suitable recesses will be presented for engaging said catches, substantially as described.

2. In combination with an equal-sided hollow frame constituting the camera-box, a hollow frame constituting the camera-back with its edge rabbeted to leave a projecting margin around the equal-sided anterior portion which fits inside the open end of the said box, and movable catches of sheet metal mounted on the said camera-box so as to lie and to move in the plane of said back, this latter being provided on said anterior portion with retaining-recesses on adjacent sides of the same, for making said back reversible, substantially as described.

3. In combination with the square box of a photographic camera, and a rabbeted square back provided with retaining-recesses on adjacent sides of the equal-sided anterior portion of said back which fits inside the said box and also with a margin to cover the rear edge of said box, a movable catch of sheet metal lying in the plane of said back in the joint between the said rear edge of said box and the said margin of said back, substantially as described.

4. In combination with the hollow equal-sided frames constituting respectively the camera-box and the back which supports the holder for the sensitive plate or film, fixed catches mounted on said box to lie in the plane of said back, and movable catches of sheet metal so mounted on said box as to move as well as to lie in the plane of said back, this latter being provided on adjacent sides thereof with retaining-recesses for both sorts of catches, substantially as described.

5. In combination with the equal-sided camera-box, and movable sheet-metal catches lying and moving in the plane of the camera-back, a camera-back in the form of a hollow frame with its edge rabbeted to leave an anterior equal-sided portion which fits into said box, said back being provided on said anterior portion with duplicate retaining-recesses for the said catches and with projecting guides on the posterior portion for receiving between them the plate or film holder, substantially as described.

In testimony whereof I affix my signature in presence of two witnesses.

HARVEY W. LOCKE.

Witnesses:
J. M. WALMSLEY,
FRED K. TOWNSEND.